Aug. 28, 1956   P. W. GAENSSLE   2,760,601
MOUNTING MEANS FOR DISK BRAKE OPERATING MECHANISM
Filed March 17, 1953                    2 Sheets-Sheet 2
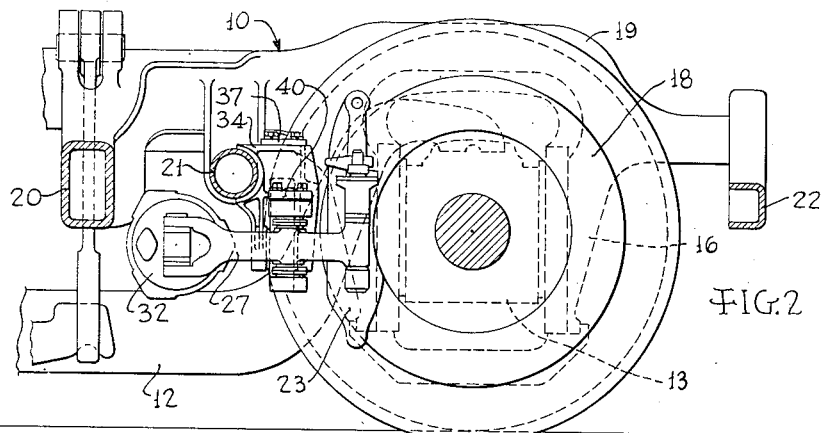
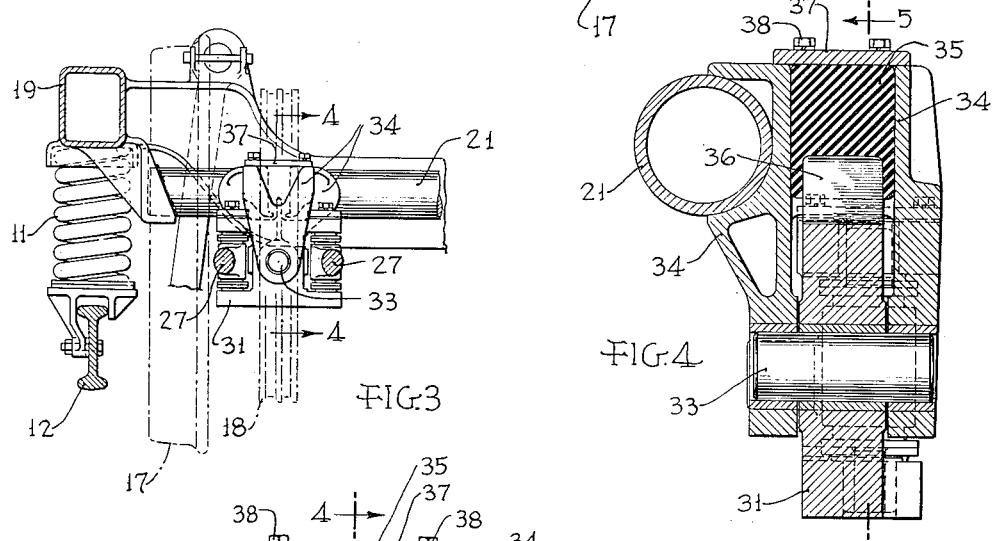
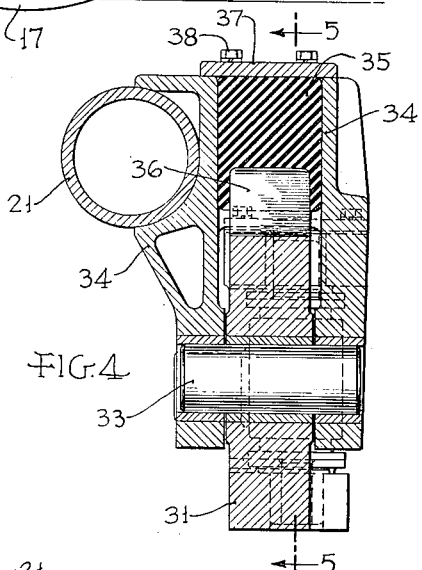
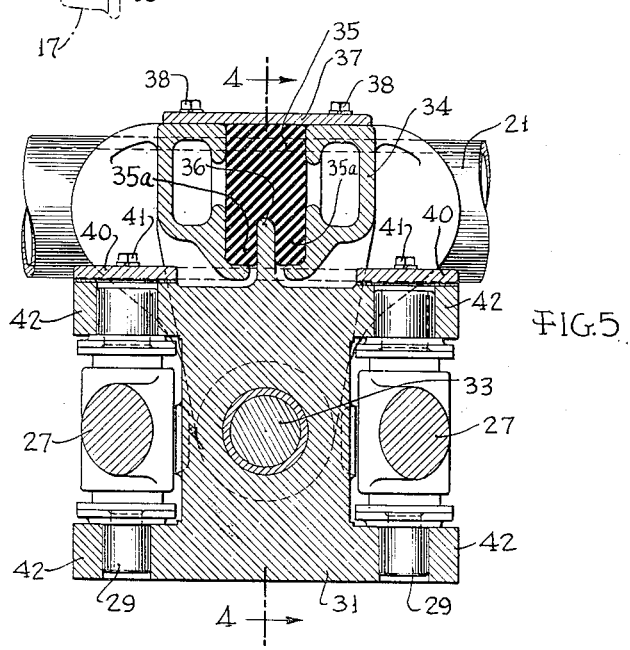
INVENTOR
Paul W. Gaenssle
BY Maurice A. Crews
ATTORNEY

United States Patent Office 2,760,601
Patented Aug. 28, 1956

2,760,601

MOUNTING MEANS FOR DISK BRAKE OPERATING MECHANISM

Paul W. Gaenssle, Farmington, Mich., assignor to The Budd Company, Philadelphia, Pa., a corporation of Pennsylvania Application March 17, 1953, Serial No. 342,840

3 Claims. (Cl. 188—59)

This invention relates to mounting means for disk brake operating mechanism of the type shown in Patent No. 2,622,704 to Gaenssle and Coombes and has for an object the provision of improvements in this art.

Brakes of this type and their operating mechanisms have heretofore been mounted on a separate C or U-shaped frame, the ends of which were carried by the ends of the axle and whose intermediate portion was supported on the truck frame. Such mounting on the axle maintained the shoes carried by the C-frame aligned with the disks carried by the axle. The patent, referred to above, provided separate movement of the brake mechanism for each disk rather than conjoint movement of the mechanisms for both disks on a C-frame and to this end the brake mechanism was mounted so as to have turning movement about a longitudinal axis which passed through the plane of the disk and which was approximately radial to the disk. Turning movement about this axis was restricted by resilient elements provided at a distance on each side of the axis.

It is a particular object of the present invention to improve the mounting assembly and the resilient means for limiting the turning movement of the brake operating mechanism about this longitudinal axis.

One exemplary form of apparatus embodying the present invention is illustrated in the accompanying drawings thereof, wherein:

Fig. 2 is a longitudinal vertical sectional view taken on the line 2—2 of Fig. 1;

Fig. 3 is a partial transverse sectional view taken on the line 3—3 of Fig. 1;

Figure 1:
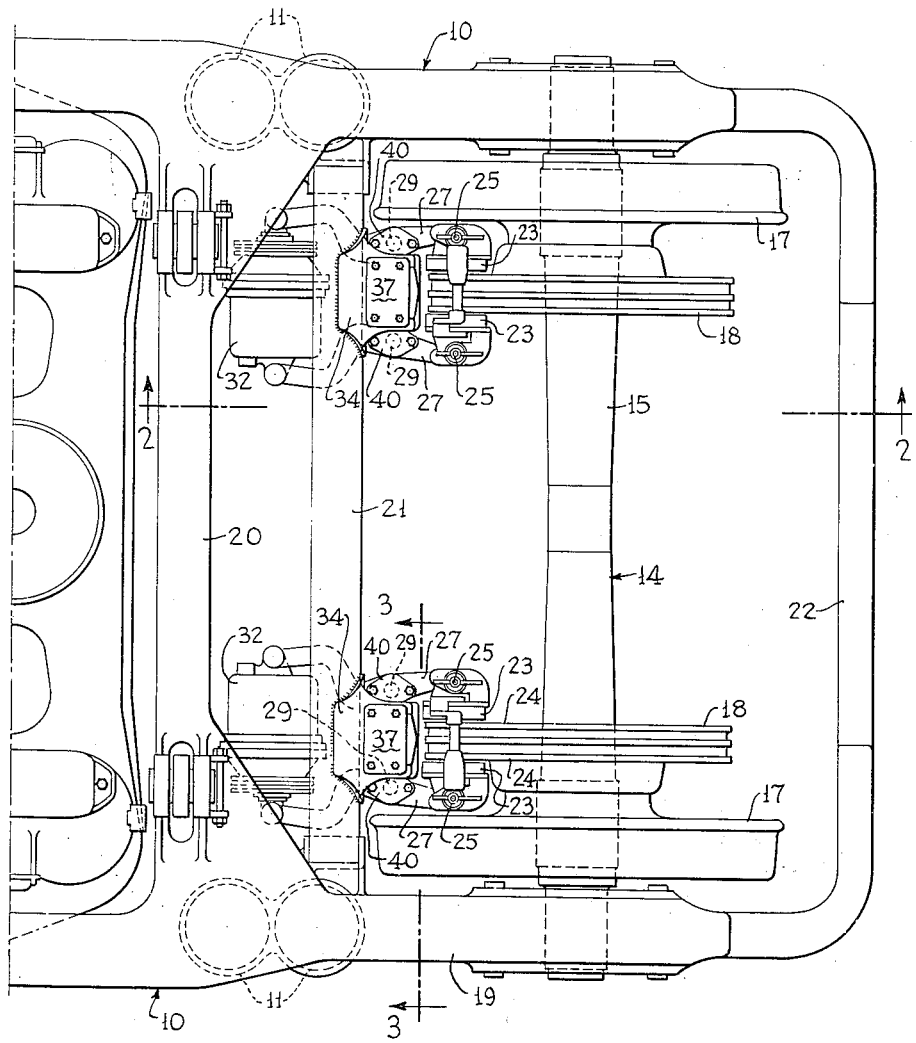
Fig. 1 is a plan view of one end of a railway truck having the present invention applied thereto.

Fig. 4 is an enlarged vertical sectional view taken approximately on the line 4—4 of Figs. 3 and 5; and Fig. 5 is a vertical sectional view taken on the line 5—5 of Fig. 4.

The truck on which apparatus embodying the present invention is mounted comprises a frame 10 which is resiliently supported by spring nests 11 from equalizers 12, the ends of which rest on top of journal boxes 13. The wheel and axle assembles, generally designated by the numeral 14, have a slight lateral tilting movement relative to the truck frame 10 in service.

The wheel-axle assembly 14 comprises an axle 15, having its ends mounted in the journal boxes 13 which are vertically movable between pedestal jaws 16 of the frame, and also comprises wheels 17 and brake disks 18 mounted on the axle.

The truck frame comprises longitudinal side frame elements 19 and interconnecting transoms 20, 21 and 22.

There is a separate brake and operating mechanism or unit for each brake disk, each such unit comprising segmental brake shoes 23 associated with the radial braking surfaces 24 of a disk 18. The shoes 23 are pivotally supported, as by pins 25, on one end of the brake levers 27, which levers 27 are pivoted intermediate their ends as by pins 29 carried by a brake support 31.

A cylinder-piston power device 32 is connected between the outer ends of the levers 27 for operating the brakes.

Each brake operating unit support 31 is mounted, as on a longitudinally extending pivot pin 33 having its axis so disposed as to pass through the plane of the disk and which is generally radially disposed relative to the brake disk, to provide tilting movement necessary to keep the brake shoes properly aligned on the disk surfaces as the wheel-axle assembly tilts in operation relative to the truck frame on which the brake operating units are mounted. Pivot pin 33 is mounted in a bracket 34 secured to a transom 21, as by welding. As is shown in Fig. 3, the axis of pivot pin 33 lies approximately in the horizontal plane which passes through the levers 27 and in the vertical plane which passes through the center of the thickness of the disk 18.

The brake support 31, which carries the pivot pins 29 for the levers 27, is resiliently restricted in its turning movement about the pin 33, as by pad-like rubber elements 35a arranged on opposite sides of a plate 36 carried by the support 31. The pad-like elements 35a may be formed integrally with a larger rubber piece 35 which is positioned in a recess in the bracket 34, the rubber piece being retained, as by a cap plate 37 held by cap screws 38.

Pins 29 are retained after assembly in the support 31, as by a cap plate 40 and screws 41. When the pins 29 are pulled up and removed the levers 27 can be removed from between the pin supporting ears 42 of the support 31. When the pin 33 is removed the entire brake unit can be dropped down and removed, the plate 36 being pulled out from between the rubber elements 35a in this downward movement.

It is thus seen that the invention provides a simple, inexpensive and dependable mounting for brake operating mechanism and improved means for resiliently limiting the turning movement of the assembly.

While one embodiment has been described by way of illustration, it is to be understood that there may be other embodiments within the general scope of the invention.

What is claimed is:

1. Mounting means for disk brake operating mechanism in an assembly including a truck frame and a wheel-axle unit have a brake disk on the axle adjacent each wheel, the combination therewith of brake shoes on each side of a disk, a bracket secured on the truck frame, a brake unit support, brake levers mounted on pivots on said support and carrying said shoes, the lever pivots including pivot pins removable from the upper part of said support past said bracket, a pivot for said support on said bracket having an axis of turning movement which lies in a horizontal plane passing through said brake levers and in a vertical plane passing through the center of thickness of the disk, an oscillatable plate carried by said support, and resilient pads carried by said truck frame for resisting the oscillating movement of said plate, said plate being insertable into assembly position with said pads by upward movement from below.

2. Mounting means for disk brake operating mechanism in an assembly including a truck frame and a wheel-axle unit with a brake disk on the axle and having tilting movement relative to the frame, the combination therewith of a mounting bracket on a cross-member of said frame, a support for brake operating mechanism mounted on a longitudinal axis on said bracket, pivoted brake levers carrying brake shoes and lever operating means mounted on said support, the longitudinal axis of said bracket lying in a horizontal plane passing through said brake levers and in a vertical plane which passes through the center of thickness of said disk, the pivots for said brake levers comprising pivot pins removable from the upper part of said support past said bracket, and means between said support and bracket for resiliently resisting turning movement of the support relative to the bracket, said means including a plate on one of said support and bracket, and rubber pads on the other of said support and bracket against which said plate reacts to oscillating movement, said plate and pad being formed and arranged for assembly by movement of one of them in a vertical direction.

3. The combination as set forth in claim 2, wherein said rubber pads are formed on a larger block of rubber set into a recess and held in place by a cover, said plate being removable from between said pads at the end of the recess opposite said cover.

References Cited in the file of this patent

UNITED STATES PATENTS

| | | |
|---|---|---|
| 2,250,393 | Rado | July 22, 1941 |
| 2,622,704 | Gaenssle et al. | Dec. 23, 1952 |